United States Patent
Moshe et al.

(10) Patent No.: US 11,995,763 B2
(45) Date of Patent: May 28, 2024

(54) SYSTEM AND METHODS FOR ENVIRONMENT MAPPING

(71) Applicant: VAYYAR IMAGING LTD., Yehud (IL)

(72) Inventors: Shay Moshe, Petach Tikva (IL); Ian Podkamien, Petach Tikva (IL)

(73) Assignee: VAYYAR IMAGING LTD., Yehud (IL)

(*) Notice: Subject to any disclaimer, the term of this patent is extended or adjusted under 35 U.S.C. 154(b) by 699 days.

(21) Appl. No.: 17/257,012

(22) PCT Filed: Jul. 2, 2019

(86) PCT No.: PCT/IL2019/050735
§ 371 (c)(1),
(2) Date: Dec. 30, 2020

(87) PCT Pub. No.: WO2020/008458
PCT Pub. Date: Jan. 9, 2020

(65) Prior Publication Data
US 2021/0141082 A1 May 13, 2021

Related U.S. Application Data

(60) Provisional application No. 62/711,638, filed on Jul. 30, 2018, provisional application No. 62/692,898, filed on Jul. 2, 2018.

(51) Int. Cl.
*G06T 17/00* (2006.01)
*G01S 13/89* (2006.01)
(Continued)

(52) U.S. Cl.
CPC .............. *G06T 17/00* (2013.01); *G01S 13/89* (2013.01); *G06F 18/2413* (2023.01);
(Continued)

(58) Field of Classification Search
CPC ........ G01S 13/89; G01S 17/89; G01S 13/865; G01S 13/867; G01S 13/931;
(Continued)

(56) References Cited

U.S. PATENT DOCUMENTS 6,750,807 B1   6/2004   Hager et al.
2008/0100498 A1   5/2008   Fullerton et al.
(Continued)

FOREIGN PATENT DOCUMENTS

WO   WO 2019/162898 A1   8/2019

OTHER PUBLICATIONS

International Search Report for PCT Application No. PCT/IL2019/050735 dated Jun. 12, 2020.

*Primary Examiner* — Olumide Ajibade Akonai
(74) *Attorney, Agent, or Firm* — Mark S. Cohen; PEARL COHEN ZEDEK LATZER BARATZ LLP

(57) ABSTRACT

Systems and methods thereof configured for mapping an environment, comprising: continuously scanning, via at least one transmit/receive module, the environments volume for detecting objects, the transmit/receive module is configured to transmit signals and receive their reflection; measuring the location of the objects' reflected signals and optionally their strength, via at least one acquisition module and at least one processor; and constructing a real-time updated three-dimensional (3D) voxels' map of the environment; and associating for each voxel a time record of events and optionally their respective event features; wherein each event comprises at least the voxel's detected presence of signal/s.

19 Claims, 9 Drawing Sheets

(51) Int. Cl.
*G06F 18/2413* (2023.01)
*G06F 18/2431* (2023.01)
*G06T 15/04* (2011.01)
*G06V 20/52* (2022.01)
*G06V 20/64* (2022.01)

(52) U.S. Cl.
CPC .......... *G06F 18/2431* (2023.01); *G06T 15/04* (2013.01); *G06V 20/52* (2022.01); *G06V 20/64* (2022.01)

(58) Field of Classification Search
CPC ...... G01S 17/931; G01S 13/87; G01S 13/723; G01S 13/90; G01S 7/4817; G01S 13/42; G01S 13/584; G06T 2207/10028; G06T 2207/10044; G06T 15/00; G06T 15/08; G06T 2215/12; G01C 21/1652
See application file for complete search history.

(56) References Cited

U.S. PATENT DOCUMENTS

| | | |
|---|---|---|
| 2011/0080336 A1 | 4/2011 | Leyvand et al. |
| 2011/0173204 A1 | 7/2011 | Murrilo et al. |
| 2014/0066757 A1 | 3/2014 | Chayat |
| 2014/0368807 A1 | 12/2014 | Rogan |
| 2017/0109582 A1 | 4/2017 | Kuznetsova et al. |
| 2018/0012370 A1* | 1/2018 | Aghamohammadi ....................... G06F 18/251 |
| 2018/0075643 A1 | 3/2018 | Sequeira et al. |
| 2018/0092628 A1 | 4/2018 | Mine et al. |
| 2018/0106896 A1* | 4/2018 | Rohani ................ G01S 13/89 |
| 2019/0162856 A1* | 5/2019 | Atalla ................ G05D 1/0276 |
| 2019/0258737 A1* | 8/2019 | Wang ................ G06F 16/287 |
| 2019/0332118 A1* | 10/2019 | Wang ................ G06N 20/00 |
| 2020/0271454 A1* | 8/2020 | Kato ................ G01C 21/30 |

* cited by examiner

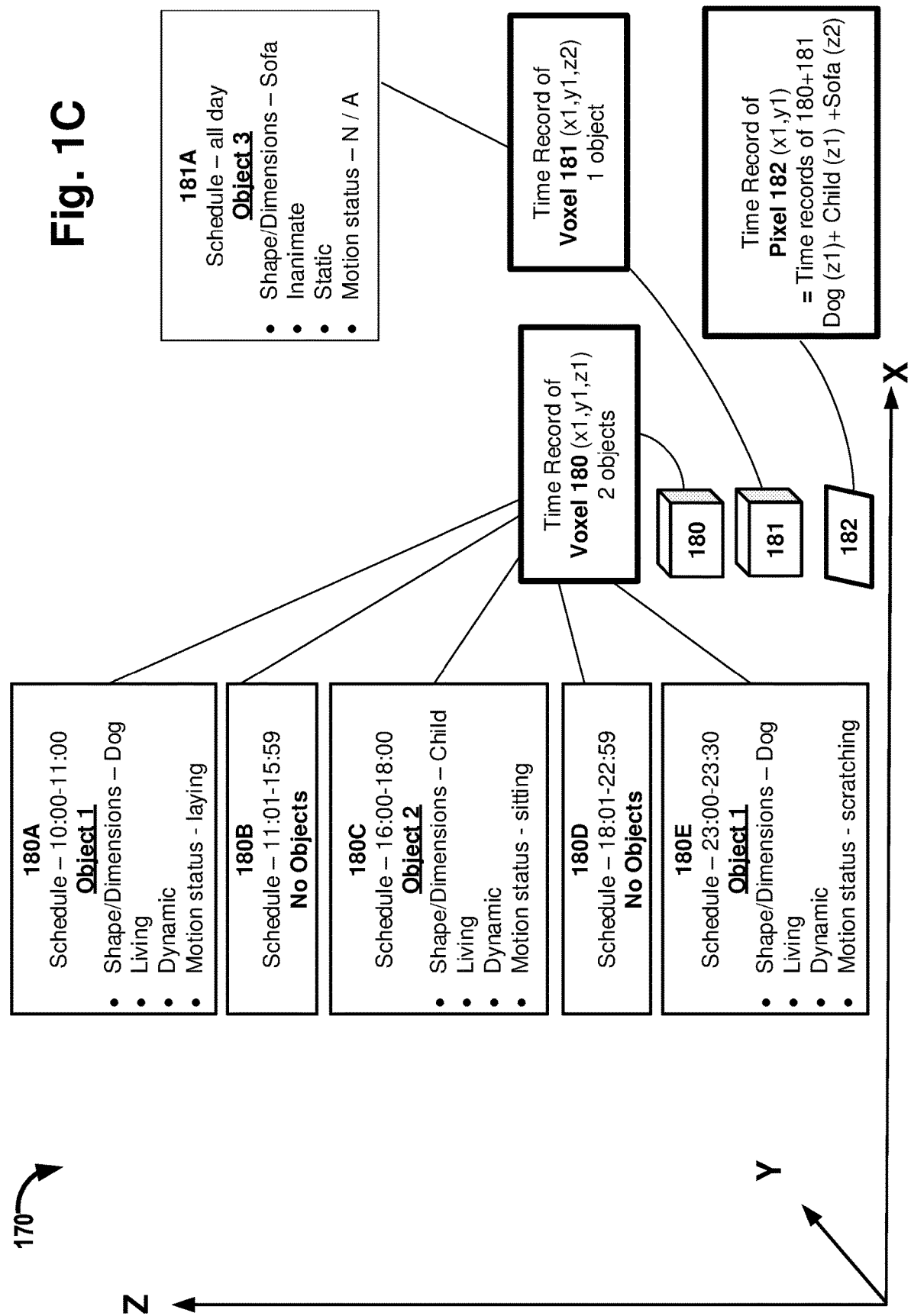

SYSTEM AND METHODS FOR ENVIRONMENT MAPPING

CROSS-REFERENCE TO RELATED APPLICATIONS

This application is a National Phase Application of PCT International Application No. PCT/IL2019/050735, International Filing Date Jul. 2, 2019, claiming the benefit of U.S. Provisional Patent Application(s) Nos. 62/692,898, filed Jul. 2, 2018, and 62/711,638, filed Jul. 30, 2018, which are hereby incorporated by reference.

TECHNICAL FIELD

The present invention relates generally to system and methods for generating and/or updating an environment map and more particularly relates to generating and/or updating an interior environment map based on processing data of the environment captured by one or more sensors.

BACKGROUND OF THE INVENTION

Along the growing demand and use of open or dynamically updated map systems for mapping outdoor environment, there is an increased need for spatial information of interior environments. The spatial information of interior environments includes location information on interior spaces, as well as detailed information such as an apartment structure and location of objects; for example, the kitchen and its kitchen appliances, office room, children rooms in the apartment and the like.

Open map systems are viable today due to the rise of crowdsourcing. Open map systems combine two major sources of data: geographic information system (GIS) databases and motion trajectories contributed by the crowd.

One of the major challenges in indoor or interior mapping is in-building coverage of the positioning means. Almost any person, powered by the GPS of his/her mobile phone, can record his/her own trajectory and send it in to help an open map system. However, this approach does not work when the GPS signal is poor or not available, hence, indoor mapping based on GPS is not accurate and sometime impossible.

Obtaining spatial information in indoor or interior environments is a challenge. In the absence of Global Navigation Satellite System (GNSS) signals, a range of technologies have been used for positioning and mapping indoor/interior spaces. However, limitations in accuracy and coverage, dependence on infrastructure and calibration issues limit the existing solutions to only a few application scenarios.

Some of the prior solutions include utilizing mobile phone. For example, using inertial sensors, accelerometers and gyroscopes, which are available on most smartphones, are used for positioning mainly based on the Pedestrian Dead Reckoning (PDR) approach, which involves step length estimation using accelerometer data. In some cases, according to the prior art solutions, inertial sensors are combined with map information or landmarks to strengthen the positioning solution. In other solutions pressure sensor built in smartphones are used to estimate the vertical position or to recognize vertical movements in space.

Other prior art methods include using and analyzing WiFi signals based on the received signal strength (RSS). In some cases, the received signal strength is combined with orientation information obtained by smartphone magnetometer. Other cases include a positioning method using wireless motes with varying transmission power by utilizing directional antennas for positioning based on RSS and the fingerprinting method.

Other sensors used for positioning in indoor environments include Ultrasonic Pseudolites, RFID (including near field communication—NFC), video camera images, 3D video cameras based on a variety of technologies (stereoscopic cameras, cameras based on structured light illumination, time-of-flight cameras), as well as laser scanners and infrared images are used to localize and track moving targets in large indoor environments.

The prior indoor mapping systems can be less than ideal in at least some respects. Prior systems require using large number of sensing units, transmitting and receiving units and additional devices, as a result the cost of prior mapping systems can be greater than would be ideal. Use of 3D radar technology, as proposed here, overcomes many of the deficiencies of other sensing modalities. In particular, the lower resolution of the 3D images provided by radar technology are advantageous in terms of privacy over visual image technologies. Radio waves are able to penetrate obstacles such as glass barriers, curtains, gypsum walls, allowing thus mapping visually obstructed spaces or mapping of a room adjacent to the room in which the sensor is installed. Radio waves are able to detect objects in low visibility conditions such as darkness, smoke, mist and fog.

Additionally, prior indoor mapping systems accuracy is low, and typically they provide only XY coordinates. Furthermore, prior indoor mapping systems may not be configured to provide three-dimensional images or visual representation of the indoor environment.

Furthermore, indoor mapping for example: houses, offices, factories, shopping malls, theatre, or any other working or living environments, involves the measurements many elements, including: walls, doors, windows, and current furniture location.

Interior mapping is useful for planning indoor motion. For example: for robotic navigation, planning for—or prediction of—people mass motion, allow an analysis of human behavior indoors, to plan location- and/or context-based services, detecting hazards and more.

The above-mentioned indoor/interior or any predefined environment mapping targets or aims require plurality of measurements, which are time and resources consuming, and may be limited or distracted by local obstacles (walls, doors, furniture) or by vision conditions (light, smoke, fluids). Accordingly, there is a long felt need for a fast predefined environment mapping that can overcome the above-mentioned limitations.

SUMMARY OF THE INVENTION

According to some embodiments, a computer implemented method is provided, configured for mapping an environment, the method comprising:
  continuously scanning, via at least one transmit/receive module, the environment's volume for detecting objects, the transmit/receive module is configured to transmit signals and receive their reflection;
  measuring the location of the objects' reflected signals and optionally their strength, via at least one acquisition module and at least one processor; and
  constructing a real-time updated three-dimensional (3D) voxels' map of the environment; and associating for each voxel a time record of events and optionally their respective event features; wherein each event comprises at least the voxel's detected presence of signal/s.

According to some embodiments, the method further comprising:
continuously analyzing the record of each voxel in the map, with respect to the record of its neighbor voxels, to determine if objects are detected and their associated features; the features of each detected object comprise one or more of: signal/s strength, dimensions, shape, motion spatial patterns and motion schedule patterns; and
continuously updating the event records of the respective voxels with the detected objects and their associated features.

According to some embodiments, the method further comprising:
continuously classifying the detected objects, based on their detected features; and
continuously updating the event records of the respective voxels with the classification of the detected objects;

According to some embodiments, the classification comprises determining at least one of:
whether each of the detected objects is static or dynamic;
whether each of the detected objects is a living object or an inanimate object;
material of each of the detected objects;
a purpose and/or use of at least one of the detected objects and/or a collection of the detected objects;
a purpose and/or use of the motion pattern and/or the motion schedule of at least one of the detected objects;
wellbeing and/or status of at least one of the detected objects; and
any combination thereof.

According to some embodiments, the step of classifying further comprises comparing the features of each detected object to a database of known objects and their corresponding features and/or classifications.

According to some embodiments, the step of classifying further comprises updating the database with the features of the newly classified objects.

According to some embodiments, classifying comprises instructing the detected and/or classified object to perform at least one known motion pattern and updating the database based on the scanned motion features.

According to some embodiments, the method further comprising associating each voxel with its events' statistics; wherein the statistics are evaluated per at least one of: the signals' strength, the detected objects, the features of the detected objects, the determined classifications of the detected objects and any combination thereof.

According to some embodiments, the method further comprising alerting of an unusual motion pattern of at least one of the detected objects, based on the voxels' associated statistics.

According to some embodiments, the step of scanning further comprises transmitting radar signals and receiving reflected radar signals, via the at least one transmit/receive module; wherein the radar signals are selected from a group comprising: pulse signals; stepped frequency signals; frequency-modulated continuous-wave (FMCW) signals; and chirp signals.

According to some embodiments, the environment comprises at least one of: an indoor space, an outdoor predefined space, a vehicle interior, an aircraft interior, a spacecraft interior.

According to some embodiments, the motion pattern comprises at least one of: direction, gesture, attribute, trait, habit, and characteristic feature.

According to some embodiments, the step of scanning further comprises:
transmitting a plurality of transmitted radar signals towards the objects, each signal of the plurality of signals emanating from a separate radar antenna; and
receiving reflected radar signals, each of the reflected radar signals having an amplitude attenuation and a phase shift relative to the transmitted radar signal;
and wherein the step of measuring further comprises:
decomposing the reflected radar signals into signal elements, each of the signal elements having a spatial component and a temporal component; and
computing a periodicity of each of the signal elements from the temporal component associated with each of the signal elements.

According to some embodiments, the step of scanning further comprises:
transmitting a plurality of transmitted radar signals towards a set of the objects, each signal of the plurality of signals emanating from a separate radar antenna; and
receiving reflected radar signals, each of the reflected radar signals having an amplitude attenuation and a phase shift relative to the transmitted signal;
and wherein the step of constructing further comprises:
assigning a voxel value to each voxel in accordance with a collective amplitude attenuation and a collective phase shift of the reflected radar signals;
decomposing the voxel values into voxel elements, each of the voxel elements having a spatial component and a temporal component; and
computing a periodicity of each of the voxel elements from the temporal component associated with each of the voxel elements.

According to some embodiments, the method further comprising displaying the reconstructed map, and optional alerts.

According to some embodiments, the method further comprising constructing a two-dimensional (2D) pixels' map by reducing a dimension from the 3D voxels' map; for each pixel associating the time record of events of its corresponding voxels and their reduced measure.

According to some embodiments, a system is provided configured for mapping an environment, the system comprising:
at least one transmit/receive module configured to transmit radar signals and receive reflected radar signals through an antenna array, and thereby configured detect location over time of at least one object in the environment;
at least one acquisition module configured to collect and digitize the signals from the transmit/receive module;
at least one processor coupled to the at least one acquisition module, the processor configured to control the at least one transmit/receive module, and to process real-time radar signals received therefrom, wherein the processor contains memory storage for data and is arranged to perform:
continuously scan, via the at least one transmit/receive module, the environment's volume to detect objects;
measure the location of the objects' reflected signals and optionally their strength, via the at least one acquisition module and the at least one processor;
construct, via the at least one processor, a real-time updated three-dimensional (3D) voxels' map of the environment, wherein and for each voxel, the map associates a time record of events and optionally their respective event features; wherein each event comprises at least the voxel's detected presence of signal/s.

According to some embodiments, the system further comprising a display and sound device configured to present the constructed map and optional alerts.

According to some embodiments, the at least one transmit/receive module comprises:
a wideband electromagnetic transducer array, the array comprising a plurality of electromagnetic transducers;
a transmitter unit configured to apply radio frequency (RF) signals to the electromagnetic transducer array; and
a receiver unit configured to receive coupled RF signals from the electromagnetic transducers array;
and wherein the RF signals are selected from a group comprising: pulse signals; stepped frequency signals; frequency-modulated continuous-wave (FMCW) signals; chirp signals.

According to some embodiments, the environment comprises at least one of: an indoor space, an outdoor predefined space, a vehicle interior, an aircraft interior, a spacecraft interior.

According to some embodiments, at least one of the processors includes the data acquisition module, which is configured to collect and to digitize the signals from the transmit/receive module.

According to some embodiments, a system is provided for environment mapping, the system comprising: a plurality of sensors, the plurality of sensors are configured to: detect location over time of at least one object in the environment; generate data of the environment, the data comprising location dependent activity related attributes of the detected multiple objects.

According to some embodiments, the one or more processors are configured to: receive the data; analyze the data to yield a map of the environment.

According to some embodiments, the location dependent attributes of the multiple objects are one or more of: time of arrival (in the point in space); frequency of arrival; posture dependent attributes; activity dependent attributes.

According to some embodiments, the map comprises two dimensional or three-dimensional depiction of the environment. The two dimensional depiction may include height-related attributes, such as typical height of a person when at a given location.

According to some embodiments, the depiction comprises the number of rooms, size and type of the rooms.

According to some embodiments, the depiction comprises one or more diagrams illustrating the type, location and size of one or more elements in the environment.

According to some embodiments, the plurality of sensors comprises: a wideband electromagnetic transducer array, the array comprising a plurality of electromagnetic transducers; a transmitter unit for applying radio frequency (RF) signals to the electromagnetic transducer array; and a receiver unit for receiving coupled RF signals from the electromagnetic transducers array.

According to some embodiments, the radar is selected from a group consisting of: pulse radar; stepped frequency radar; FMCW radar; MIMO (multi-input multi-output) radar.

According to some embodiments, the environment is an indoor environment. According to some embodiments, the indoor environment is an apartment.

According to some embodiments, the depiction comprises spatial information of the indoor environment and/or location info on indoor spaces as well as detailed information such as an apartment structure and location of objects and room location.

According to some embodiments, the environment is outdoor environment.

According to some embodiments, the depiction comprises spatial information of the outdoor environment.

According to some embodiments, the environment is an interior of a vehicle. Non-limiting examples are a cabin of a passenger car, of a bus, a train or an airplane. An example of the depiction comprises locations and reference heights of passenger seats.

According to some embodiments, the sensor array is a 3D sensor array.

According to some embodiments, a system is provided configured for mapping environment, the system comprising: a plurality of sensors, the plurality of sensors are configured to: detect presence over time in the environment of at least one object; generate data of the environment, the data comprising location dependent activity related attributes of the detected multiple objects.

According to some embodiments, the one or more processors are configured to: receive the data; and analyze the data to yield a map of the environment.

According to some embodiments, an indoor mapping method is provided. The method for indoor mapping comprising:
installing at least one three-dimensional (3D) radio frequency (RF) sensor within the room to be mapped, the sensor configured to track motion of subjects within the room;
scanning the indoor volume for subjects;
classifying the identified subjects;
identifying current and on-going (X,Y,Z) location of the subjects in the indoor volume, therefore identifying a motion pattern per each of the subjects; and
based subjects' identified motion patterns, constructing a motion available vs. non-available 3D model.

According to some embodiments, a system is provided for detecting and measuring subjects' motion in a room, for mapping entities within the room, the system comprising:
at least one radar antenna, configured to be installed within the room to be mapped and to track motion of subjects within a room;
at least one transmit/receive module, coupled to the at least one radar antenna; and
at least one processor configured for controlling the at least one transmit/receive module, and for processing radar images received therefrom, wherein the processor contains memory storage for data and is arranged to perform:
controlling a scanning of the indoor volume for subjects;
classifying the identified subjects;
identifying current and on-going (X,Y,Z) location of the subjects in the indoor volume,
identifying a motion pattern per each of the identified subjects; and
based the identified subjects' motion patterns, constructing a motion available vs. non-available 3D model.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1C schematically demonstrates an example of the data generated by the system and/or methods, in accordance with some embodiments;

Figure 1A:
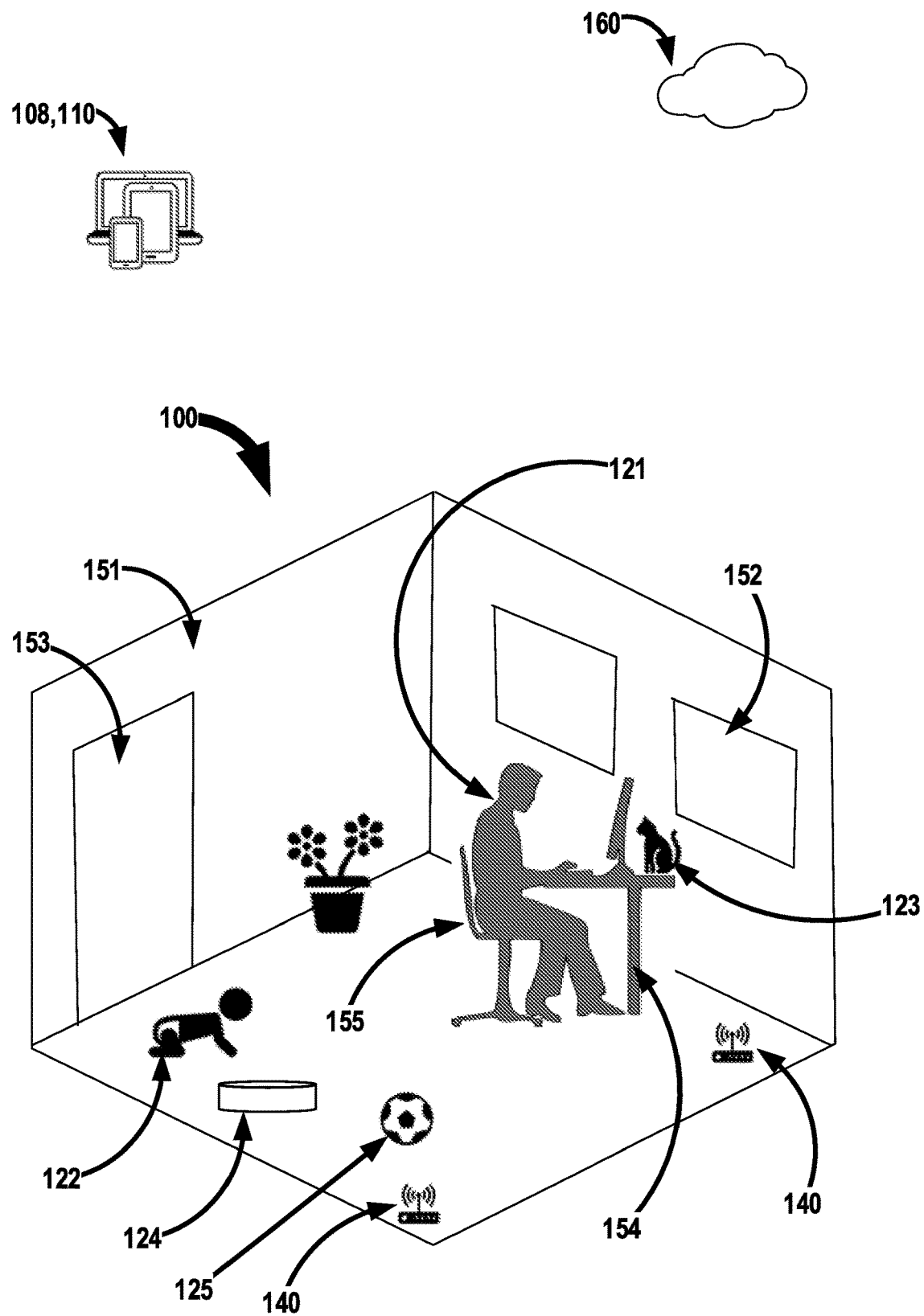
FIG. 1A schematically demonstrates a room to be mapped with moving subjects therein, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is made to FIG. 1A, which demonstrates a room 100 to be mapped with an example of five dynamic objects therein: a grown person 121, a crawling baby 122, a cat 123, a floor cleaning robot 124 and a ball 125.

Figure 1B:
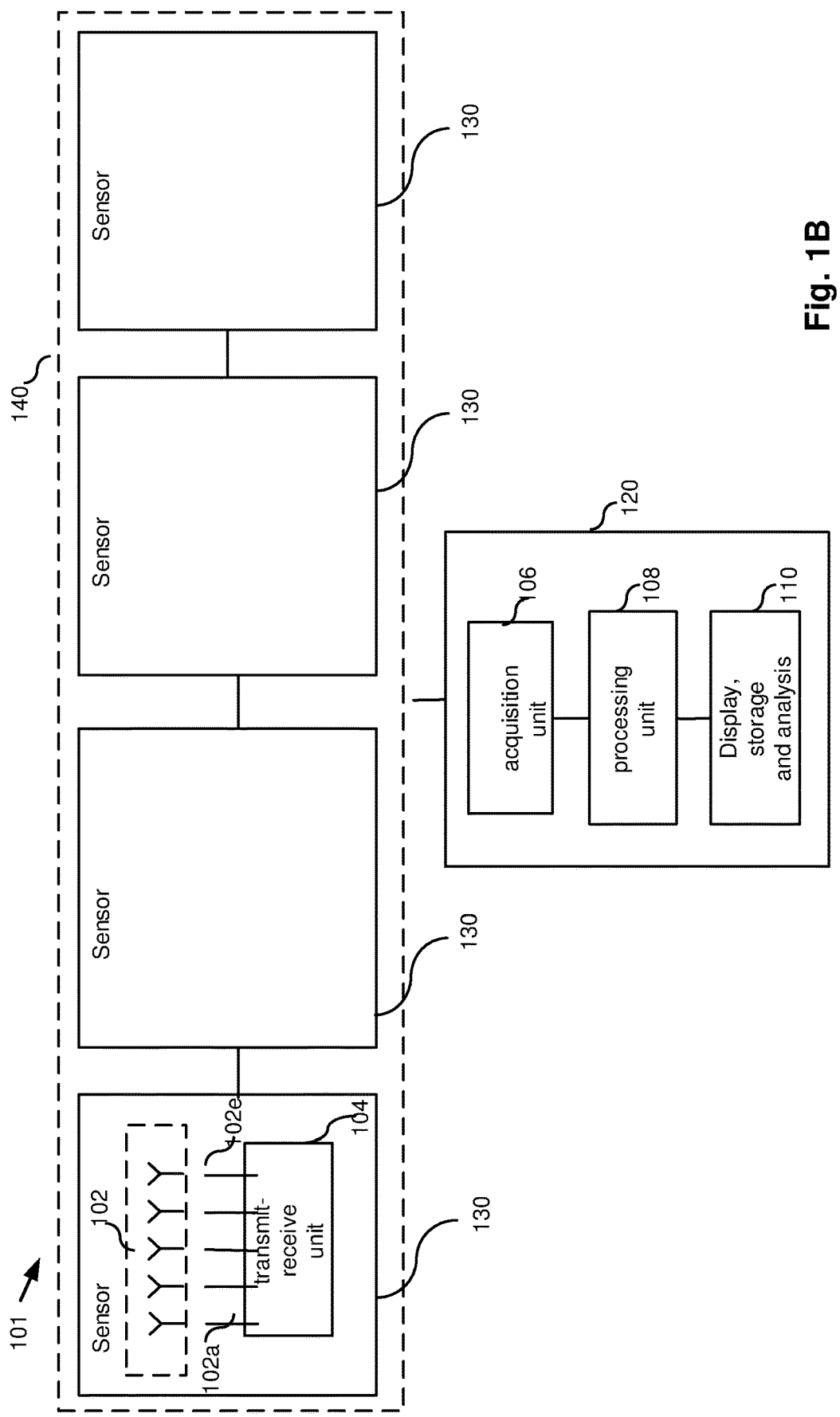
FIG. 1B schematically demonstrates a sensing system, in accordance with some embodiments.

Reference is made to FIG. 1B, which demonstrates a system 101 according to some embodiments, configured for mapping an environment, the system comprising:
- at least one transmit/receive module 140 configured to transmit signals and receive reflected signals through an antenna array, and thereby configured detect location over time of at least one object in the environment;
- at least one acquisition module 106 configured to collect and digitize the signals from the transmit/receive module;
- at least one processor 108 coupled to the at least one acquisition module, the processor/s configured to control the at least one transmit/receive module, and to process real-time signals received therefrom.

Figure 1D:
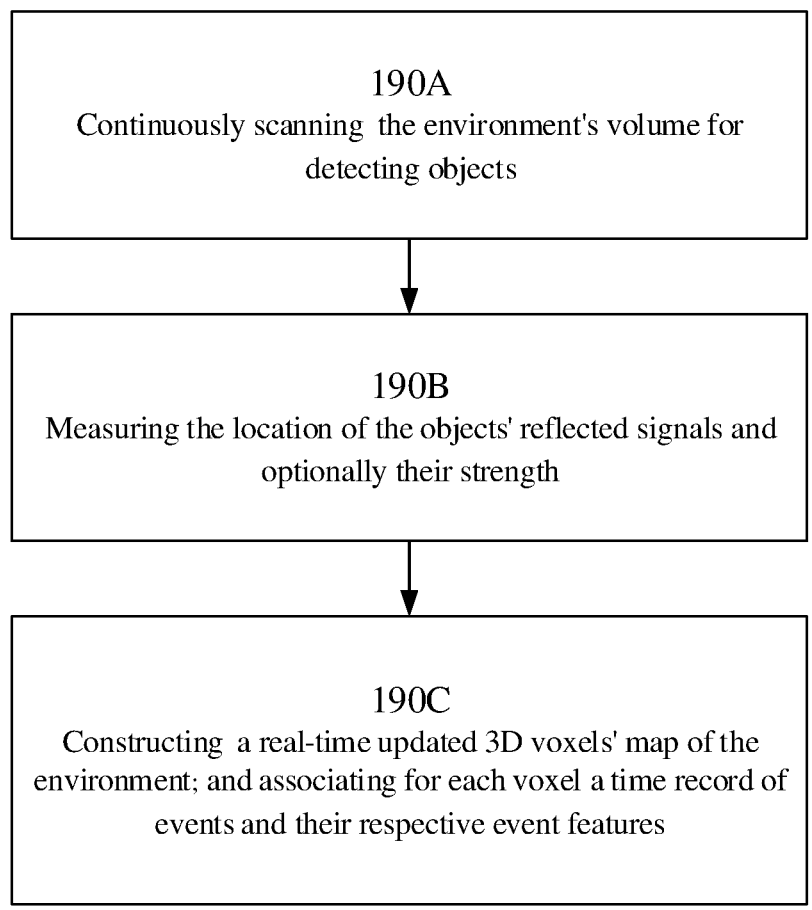
FIG. 1D schematically demonstrates methods steps for constructing an environment map, according to some embodiments.

According to some embodiments, and as demonstrated in FIG. 1D a computer implemented method 190 is provided configured for mapping an environment, the method comprising:
- continuously scanning 190A, via at least one transmit/receive module (FIGS. 1A-1B, 140), the environment's volume for detecting objects, the transmit/receive module is configured to transmit signals and receive their reflection;
- measuring the location of the objects' reflected signals and optionally their strength 190B, via at least one acquisition module (FIG. 1B, 106) and at least one processor; and
- constructing 190C, via at least one processor, a real-time updated three-dimensional (3D) voxels' map of the environment; and associating for each voxel a time record of events and optionally their respective event features; wherein each event comprises at least the voxel's detected presence of signal/s.

According to some embodiments, a voxel is represented by a regular grid in three-dimensional space. According to some embodiments the length between its vertices is selected in accordance with the length width of the signals of the transmit/receive module.

According to some embodiments the method further comprising:
- continuously analyzing the record of each voxel in the map, with respect to the record of its neighbor voxels, in order to determine if objects are detected and if detected determine their associated features; the features of each detected object comprise one or more of: signal/s strength, dimensions, shape, motion spatial patterns and motion schedule patterns; and
- continuously updating the event records of the respective voxels with the detected objects and their associated features.

According to some embodiments, the term "object's dimension" refers to: the detected object's measurements, comprising: length along at least one selected axis; area at a selected cross section/s; the object's volume; and any combination thereof.

According to some embodiments, the term "object's shape" refers to the detected object's configuration comprising: contour, outline, figure, skeleton, frame, and any combination thereof.

According to some embodiments, the term "object's spatial pattern" refers to the detected object's current and previous 2D or 3D location or location related events, comprising: 2D or 3D trajectory, velocity, acceleration, height, and any combination thereof. Few non-limiting examples can include: a person's morning routine in one's house (bathroom, coffee stand); a person climbing stairs, a cat walking and using its litter box, a dog chasing its tail; a ball rolling down a slope, and more.

According to some embodiments, the term "object's schedule pattern" refers to the detected object's time of motion by means comprising: date, hour, day of the week, time of the day (e.g. around morning, noon, afternoon, evening, night), duration of the event, frequency of the event, after a certain event, and any combination thereof.

According to some embodiments, the method further comprising:
- continuously classifying the detected objects, based on their detected features; and
- continuously updating the event records of the respective voxels with the classification of the detected objects.

According to some embodiments, the classification comprises determining at least one of:
- whether each of the detected objects is static or dynamic; non-limiting examples for static objects include wall, stairs, sofa, chair, plant, and tv; non-limiting examples for dynamic objects include human, animal, cleaning robot, and ball; according to some embodiments, an object is classified as static, when standing still for a predetermined period of time, otherwise dynamic;

whether each of the detected objects is a living object or an inanimate object; according to some embodiments and object is determined as living if a heartbeat and/or a breathing pattern is detected, as exemplified in application PCT/IB2019/051460 incorporated by reference herein;

material of each of the detected objects; according to some embodiments, the material is determined based on the signal reflectance;

a purpose and/or use of at least one of the detected objects and/or a collection of the detected objects; according to some embodiments, this is determined based on the objects motion pattern and its schedule, non-limiting examples include: a coffee machine being used by a grownup, every morning; a cleaning robot which is a low level moving objects that randomly bumps into static objects;

a purpose and/or use of the motion pattern and/or the motion schedule of at least one of the detected objects; a non-limiting example includes: a dog chasing its tail;

wellbeing and/or status of at least one of the detected objects; non-limiting examples include: status of a cleaning robot (e.g. charging/cleaning), man sitting/walking or laying in the bathtub too long; and any combination thereof.

A non-limiting example of a constructed 3D map 170 is provided in FIG. 1C, demonstrating two voxels 180,181, and their time records of events; events 180A-180E for voxel 180 and event 181A for voxel 181. The constructed map 170 demonstrated a voxel 181 constantly occupied with a static sofa object (event 181A), and a neighbor voxel 180, which is located just above voxel 181; voxel 180 demonstrates dynamic occupation of detected child event 180C and a detected dog events 180A and 180E.

According to some embodiments, the step of classifying further comprises comparing the features of each detected object to a database of known classified objects and their corresponding features and/or classifications. According to some embodiments, the comparing is to at least one threshold. According to some embodiments, the step of classifying further comprises updating the database with the features of the newly classified objects.

According to some embodiments, classifying comprises instructing a detected and/or classified object to perform at least one known motion pattern and updating the database based on the scanned motion events and features. Non-limiting examples include: instructing a person to walk along walls, to open/close windows, doors, cabinets ex., to step into the kitchen and open the refrigerator, to seat next to one's desk, and to climb upstairs.

According to some embodiments, the method further comprising associating each voxel with its events' statistics; wherein the statistics are evaluated per at least one of: the signals' strengths, the detected objects, the features of the detected objects, the determined classifications of the detected objects and any combination thereof. Non-limiting examples include: average height of objects passing a voxel (even a lower voxel), duration of these objects at this voxel, frequency, velocity, direction, and time of the day; average height of objects passing a voxel, duration of these objects at this voxel, frequency, velocity, direction, and time of the day.

According to some embodiments, the method further comprising alerting of an unusual motion pattern of at least one of the detected objects, based on the voxels' associated statistics. Non-limiting examples include: classified location related with classified person in distress (drowning, falling, stuck, ex); suspicious activity (a person entering through a window); earthquake (all furniture moving in a pattern).

According to some embodiments, the step of scanning further comprises transmitting radar signals and receiving reflected radar signals, via the at least one transmit/receive module; wherein the radar signals are selected from a group comprising: pulse signals; stepped frequency signals; frequency-modulated continuous-wave (FMCW) signals; and chirp signals.

According to some embodiments, the environment comprises at least one of:
an indoor space; non limiting examples include: rooms, apartments, houses, offices and shopping malls;
an outdoor predefined space; non-limiting examples include: playground, swimming pool, swimming pool surrounding, and sport stadium;
a vehicle interior, an aircraft interior, and a spacecraft interior.

According to some embodiments, the motion pattern comprises at least one of: direction, gesture, attribute, trait, habit, and characteristic feature.

According to some embodiments, the step of scanning further comprises:
transmitting a plurality of transmitted radar signals towards the objects, each signal of the plurality of signals emanating from a separate radar antenna; and
receiving reflected radar signals, each of the reflected radar signals having an amplitude attenuation and a phase shift relative to the transmitted radar signal;
and wherein the step of measuring further comprises:
decomposing the reflected radar signals into signal elements, each of the signal elements having a spatial component and a temporal component; and
computing a periodicity of each of the signal elements from the temporal component associated with each of the signal elements;
as exemplified in application PCT/IB2019/051460 incorporated by reference herein.

According to some embodiments the step of scanning further comprises:
transmitting a plurality of transmitted radar signals towards a set of the objects, each signal of the plurality of signals emanating from a separate radar antenna; and
receiving reflected radar signals, each of the reflected radar signals having an amplitude attenuation and a phase shift relative to the transmitted signal;
and wherein the step of constructing further comprises:
assigning a voxel value to each voxel in accordance with a collective amplitude attenuation and a collective phase shift of the reflected radar signals;
decomposing the voxel values into voxel elements, each of the voxel elements having a spatial component and a temporal component; and
computing a periodicity of each of the voxel elements from the temporal component associated with each of the voxel elements;
as exemplified in application PCT/IB2019/051460 incorporated by reference herein.

According to some embodiments, the method further comprising displaying the reconstructed map, and optional alerts.

Additional classifying examples:

Humans can be identified based on their measurements and motion patterns, and accordingly entities such as, walls, corridors doors, closet, bed, chair, couch, table, counter top, beds, toilet, sink (wash hands) and more, can be reconstructed.

A cat can be identified by its measurements and motion pattern, and accordingly entities, such as walls, corridors, doors, window (it jumps at), a cat basket, a cat litter box and more, can be reconstructed.

A floor cleaning robot can be identified by its measurements and motion pattern, and accordingly entities, such as walls, corridors, doors, chair legs, table legs, couch base and more, can be classified.

According to some embodiments, the method further comprising constructing a two-dimensional (2D) pixels' map by reducing a dimension from the 3D voxels' map; for each pixel associating the time record of events of its corresponding voxels and a record of their reduced measure. A non-limiting example for such a reduction from 3D to 2D is provided in FIG. 1C. The demonstrated reduction involves reducing the Z axis, such that a 2D X-Y map is provided; the demonstrated pixel 182, is associated with the events of its related Z-axis voxels, in this example voxels 180 and 181. According to some embodiments, the association includes the z-measure of the reduced voxels, such that detected objects are still associated with their heights.

According to some embodiments, and as demonstrated in FIG. 1B a system is provided configured for mapping an environment, the system 101 comprising:

at least one transmit/receive module 140 configured to transmit radar signals and receive reflected radar signals through an antenna array, and thereby configured detect location over time of at least one object in the environment;

at least one acquisition module 106 configured to collect and digitize the signals from the transmit/receive module;

at least one processor 108 coupled to the at least one acquisition module, the processor/s configured to control the at least one transmit/receive module, and to process real-time radar signals received therefrom, wherein the processor contains memory storage for data and is arranged to perform:

continuously scan, via the at least one transmit/receive module, the environment's volume to detect objects 121-125,151-155;

measure the location of the objects' reflected signals and optionally their strength, via the at least one acquisition module 106 module and the at least one processor 108;

construct, via at least one processor 108, a real-time updated three-dimensional (3D) voxels' map of the environment, wherein and for each voxel, the map associates a time record of events and optionally their respective event features; wherein each event comprises at least the voxel's detected presence of signal/s.

According to some embodiments, the transmit/receive modules are scattered in the environment, such that they can scan selected heights of the environment (so as to enable a feature of height to a detected object) and/or select location in the environment. According to some embodiments, the transmit/receive modules are fixed to the scanned environment; for a non-limiting example to the interior of a vehicle, such that their motion is similar to the motion of the scanned environment.

According to some embodiments, the system further comprising a display device 110 configured to present the constructed map and optional alerts. According to some embodiments the display is further configured to play sounds.

According to some embodiments, the at least one transmit/receive module comprises:

a wideband electromagnetic transducer array, the array comprising a plurality of electromagnetic transducers;

a transmitter unit configured to apply radio-frequency (RF) signals to the electromagnetic transducer array; and a receiver unit configured to receive coupled RF signals from the electromagnetic transducers array;

and wherein the RF signals are selected from a group comprising: pulse signals; stepped frequency signals; frequency-modulated continuous-wave (FMCW) signals; chirp signals.

According to some embodiments, the at least one of the processors includes the data acquisition module, which is configured to collect and to digitize the signals from the transmit/receive module, while tagging the signals according to the antenna combination and the signal time of collection.

According to some non-limiting examples, the 3D or 2D constructed map is updated in real-time, and it's is history is saved in a memory storage unit, such that one can know where people have passed and where they have not, where they sit and where they may not, where and in which height they are lying, and what is their motion schedule, for example during day hours, and/or during which of the week days.

Accordingly, for example, wherever subjects walked—can be identified as an aisle; wherever subjects sat—is a sitting area, can be chair near table, working desk, toilet. By analyzing the logging location and time of the subjects can assist in identifying whether to sitting area is a: toilet, or dinner area, or working desk, etc. Additional queries can be applied, based on context.

Advantages of the provided 3D or 2D constructed map over methods using a light imaging camera:

Privacy: only the contour (outline) of subjects is identified, no personal identity is recorded.

No line-of-sight is required, as the radar sensing penetrates materials of entities such walls, glass windows and furniture. This allows a lower number or a reduced total number of sensors.

The sensor works and maps in any light conditions and/or fluid condition (humidity, fire sprinklers).

According to some embodiments, the provided system and methods relate generally to systems and methods for generating or updating an environment map and particularly the present invention relates to generating or updating an interior environment map based on processing data of the interior environment captured by one or more sensors.

In accordance with some embodiments, an indoor environment guide navigation system is provided configured for mapping for example crowded urban areas; according to some embodiments mapping methods thereof are provided. According to some embodiments, the provided system is configured to overcome mapping difficulties of, for example GPS based systems, which due to lack of access to satellites or the GPS limitations cannot achieve the required results.

According to some embodiments, the indoor environment or interior space includes for example: a house, apartment, mall, department store, office, garage parking, sports hall, vehicle interior, aircraft interior, spacecraft interior or the like.

According to some embodiments, the mapped environment includes a predefined limited outdoor environment, such as a playground, a street, an open shopping mall and the like.

According to some embodiments, the indoor environment includes one or more points of interest (POI) to be monitored.

In accordance with some embodiments, the mapping methods are based on contextual understanding of indoor or outdoor compositions, based on for example on an earlier collected data concerning where and when multiple objects move at the environment, for a non-limited example a cleaning robot is scheduled to clean a specific room.

In accordance with some embodiments the system comprising a number of three dimensional (3D) sensors, such as a 3D sensor array of a plurality of sensors, positioned at various locations at the indoor environment. According to some embodiments, the sensors are configured to monitor and capture motion of one or more objects at the environment over time, for generating data on the indoor environment. In some embodiments, the data includes XYZ location, time of the objects and accordingly a speed "log" over time, in high accuracy. According to some embodiments, the data can include information such as where moving objects, such as people, have passed and where not, in which direction, where do they sit and where not, where and in which height they are lying—and when during the day, and the week days the specific movement was monitored. According to some embodiments, the data can be transmitted to one or more processors configured to analyze the received data, using for example computer vision techniques.

According to some embodiments, based on the obtained data the, processors are configured to reconstruct a map such as an indoor map. The map can be a 2D or 3D map including for example the logical entities of the indoor and further information such as: corridors; areas where people walk; walls; doors/entrances; sitting locations—like sofa, kitchen tables, offices desks, etc.; sleeping locations; toilets, bath rooms; number of rooms, rooms shape, type (e.g. toilets, dinning, office etc.) and size as well as location of objects in the rooms and objects type (e.g. sofa, chairs, bed etc.).

In accordance with some embodiments the system and method are configured to track and monitor one or more objects' status at the indoor environment based on the captured reflected signals of the indoor environment.

In some embodiments, the processing can be performed on a remote processing, such as a remote network server processor FIG. 1A 108, on a cloud 160, a mobile processor, such as a mobile phone processor, and the like.

The main advantages of the provided sensing systems and methods are as follows:
Mapping an indoor environment such as a house without the need to send a technician to map, measure, or interview residents;
Allowing behavior logging;
Provide optimized services—as power save, insurance, security,—with minimal overhead and maximum personalization, while keeping resident privacy, w/o visual images.

FIG. 1B illustrates a sensing system 100, in accordance with some embodiments. As demonstrated the sensing system comprises a sensor array 140 comprising sensing units 130 which can be placed in a number of locations at the environment.

In some embodiments, the sensor array 140 is configured to sense the environment over time and monitor the movement of multiple objects at the environment to generate data of the environment. According to some embodiments, the data includes location dependent activity related attributes of the multiple objects in the environment.

In some embodiments, the location dependent activity related attributes can be one or more of time of arrival (in the point in space), frequency of arrival; activity dependent attributes.

In some embodiments, the location dependent activity related attributes can be defined as time patterns of presence at a given location, distribution of movements patterns of objects at the given location such as direction and/or velocity, vital signs such respiration rate. According to some embodiments, the time patterns can be used to yield statistical indicators, such as average time, average frequency etc.

According to some embodiments, the data can comprise XYZ coordinates and speed log and/or metadata over time of the multiple objects. For example, and as demonstrated in FIG. 1C each box in the XYZ axis, such as box 180 represent a captured environment point in the environments space and can comprise location dependent activity related attributes of the multiple objects captured at the environment.

In some embodiments, the sensor array can be a 2D or 3D sensor.

In some embodiments, the array sensor can be a radar sensor, such as a pulse radar or stepped frequency radar; Frequency Modulated Continuous Wave (FMCW) radar or multi-input multi-output (MIMO) radar.

In some embodiments, the sensor units 130 can have a multi-layer structure implemented at least in part with printed circuit board techniques using appropriate dielectric materials. Commonly used materials are glass-epoxy, Teflon-based materials. Layers of high-dielectric-constant materials can be incorporated in order to match the antennas to materials under test.

According to some embodiments, the sensor array 140 can include or can be in communication with a transmit/receive unit 104, a data acquisition unit 106, and a processing unit 108.

According to some embodiments, the sensing units 130 can include one or more antennas, such as antenna array 102. For a non-limiting example, the antenna array 102 can include multiple antennas 102a-102e typically between a few and several tens (for example 30) antennas. According to some embodiments, the antennas can be of many types known in the art, such as printed antennas, waveguide antennas, dipole antennas or "Vivaldi" broadband antennas. According to some embodiments, the antenna array can be linear or two-dimensional, flat or conformal to the region of interest.

According to some embodiments, the antenna array 102 can be an array of flat broadband antennae, for example spiral shaped antenna. According to some embodiments, the antenna array 102 can include a layer of matching material for improved coupling of the antenna radiation to the materials or objects under test. According to some embodiments, the unique and optimized shape of the antenna array, enables their use in limited sized mobile devices, such as a thin, small-sized smart phone or tablet. In addition, the use of an antenna array made as flat as possible, for example in a printed circuit, allows for the linkage of the sensing unit 130 to any mobile device known in the art, as it does not take up much space in the mobile device, it is not cumbersome, nor does it add significant weight to the portable device 120.

According to some embodiments, the transmit/receive subsystem 104 is responsible for generation of the microwave signals, coupling them to the antennas 102a-102e, reception of the microwave signals from the antennas and converting them into a form suitable for acquisition According to some embodiments, the signals (e. g. RF signals) can be pulse signals, stepped-frequency signals, chirp signals and the like. According to some embodiments, the generation circuitry can involve oscillators, synthesizers, mixers, or it can be based on pulse oriented circuits such as logic gates or step-recovery diodes. According to some embodiments, the conversion process can include down conversion, sampling, and the like. According to some embodiments, the conversion process typically includes averaging in the form of low-pass filtering, to improve the signal-to-noise ratios and to allow for lower sampling rates. According to some embodiments, the transmit/receive subsystem 104 can perform transmission and reception with multiple antennas at a time or select one transmit and one receive antenna at a time, according to a tradeoff between complexity and acquisition time.

According to some embodiments, the data acquisition subsystem 106 collects and digitizes the signals from the transmit/receive unit 104, while tagging the signals according to the antenna combination used and the time at which the signals were collected. According to some embodiments, the data acquisition subsystem typically includes analog-to-digital (A/D) converters and data buffers, but it can include additional functions such as signal averaging, correlation of waveforms with templates or converting signals between frequency and time domain.

According to some embodiments, the processing unit 108 is responsible for analyzing the data and converting the collected signals into a set of responses characterizing the captured environment, and performing the algorithms for converting the sets of responses, for example into image data.

A non-limiting example of algorithm for converting the sets of responses can be for example Delay and Sum (DAS) algorithm.

According to some embodiments, the DAS algorithm for reconstructing an image from impulse responses of the medium is as follows:

for each point r in some designated volume in the three dimensional space, and for each antenna element pair (from antenna element i to antenna element j) the expected delay $T_{ij}(r)$ from antenna element i to point r and back to antenna element j is calculated, considering the propagation velocity through the medium (which is assumed to have known electrical properties).

Then the reconstructed image at location r is created by summing the estimated impulse responses of each pair i,j after shifting them by delay Tij(r), $$s(r) = \Sigma_{ij} h_{ij}(T_{ij}(r))$$

where the summation is over all antenna element pairs.

Assuming a reflector exists at point r then we expect a positive pulse to exist at position $T_{ij}(r)$ in all, or most, pairs, creating high intensity of the reconstructed image at this point.

DAS assumes the responses $h_{ij}(t)$ refer to the impulse response of the medium under test. However, since the components involved in the measurement have responses varying in frequency and space, the direct measurement involves a combination of the medium response and the response of these components. The antenna elements used for transmission and reception proposes are usually of a high-pass nature, not being capable of transmitting very low frequencies. The frequency response of transmission/receive microwave circuits may exhibit variations due to production, aging, and temperature, and it is preferable to measure that response and take it into account.

According to some embodiments, Typical image reconstruction algorithms (such as DAS) assume perfect antenna elements, and therefore the above effects are compensated for before applying the reconstruction algorithm, e.g. by dividing the frequency response obtained from the measurement by the known frequency response of the components. As mentioned previously, this pre-calibration compensation is sub-optimal as it amplifies noise, and does not take into account that some antenna elements at some frequencies see a target better than others, nor does it apply to location-dependent amplitude and phase shift variations.

Examples for such algorithms may be found in US Patent Application Publication No. US20140066757, entitled "Wideband radar with heterogeneous antenna arrays" which application is incorporated by reference herein in its entirety.

According to some embodiments, unit 108 is responsible for Doppler processing as well, in which changes in the response over time are taken into account along with the response itself. According to some embodiments, the data processing unit can be implemented as a high-performance computing platform, based either on dedicated Digital Signal Processing (DSP) units, general purpose CPUs, or, according to newer trends, Graphical Processing Units (GPU). In some embodiments, the acquisition unit and/or processing unit may be connected to other sensors and integrate the data from those sensors to construct the images.

According to some embodiments, a final step in the process is making use of the resulting image, either in the form of visualization, display, storage, archiving, or input to feature detection algorithms.

It should be understood that while FIG. 1B illustrates functional decomposition into processing stages, some of those can be implemented on the same hardware (such as a common processing unit) or distributed over multiple (such as graphical processing unit, GPU) and even remote pieces of hardware (such as in the case of multiprocessing or cloud computing).

According to some embodiments, units 106,108 and 110 can be part of the sensor array 140 or a portable device 120, as shown in FIG. 1B.

According to some embodiments, the sensing units 130 can be included within a housing, such as case or a jacket, or can be part of a device for example a ceiling lighting device or any kitchen appliance, such as a refrigerator or an oven. In some embodiments, the sensing units 130 can be integrated within the indoor environment walls or ceiling. In some embodiments, the sensing units 130 can include the antenna array unit 102 and the transmit/receive unit 104 can be part of a housing, which is electrically or wirelessly connected to a device, such as a portable device 120, for example through a dedicated connection, such a USB connection, wireless connection, or any connection known in the art.

Figure 2A:
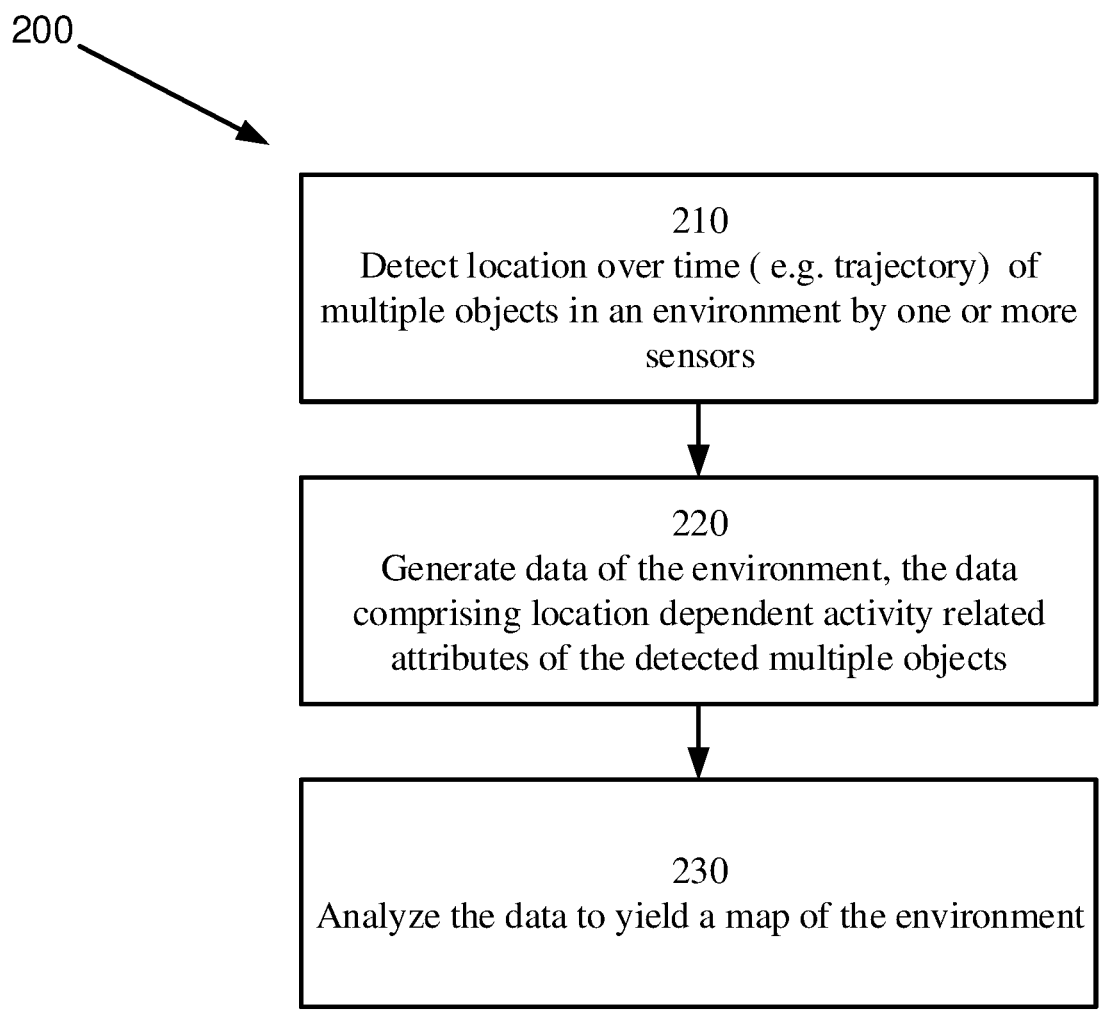
FIGS. 2A and 2B schematically demonstrate flowcharts illustrating methods for mapping an environment, in accordance with some embodiments.

FIG. 2A is a flowchart illustrating a method 200 for mapping an environment or updating an environment map such as indoor environment map, in accordance with some embodiments. At step 210 the location over time of multiple objects is detected by one or more sensors. At step 220 data including location dependent activity related attributes of the detected multiple objects is generated. The location dependent activity related attributes may include time of arrival (in the point in space), frequency of arrival, activity dependent attributes. For a non-limiting example, the detection includes detecting the location over time of one or more persons or other moving elements in one area (e.g. room #1) and other elements in another area (e.g. room #2). At step 230 the data is analyzed to yield a map of the environment. In some embodiments, the analysis includes statistically monitoring the speed (e.g. running/walking speed), path and/or direction of the identified objects over time to provide statistic data for each identified object. According to some embodiments, the statistical data is post-processed to provide the map of the captured environment. In accordance with some embodiments, the post-processing of the data includes identifying the type and size of elements or areas in the environment based on the object's movement and/or trajectory analysis of the identified objects. For a non-limiting example, the analysis can include identifying movements of a number of objects in a predefined area over time, such as movements of four objects approaching a static object and seating near the static object at specific time intervals during a day (e.g. morning, noon, evening). Accordingly, the post processing step can include identifying the static object as a table and a number of chairs surrounding the table and the predefined area is mapped as the dining hall.

In some embodiments, the object's detection includes identifying the object's trajectory and/or movement direction (e.g. path) and/or movement frequency (e.g. time of day) and/or speed.

In some embodiments, the mapping includes: identifying type of area, such as rooms type and/or size (e.g. office, bedroom, toilets etc.); number of rooms; type of objects (e.g. chair, sofa, table, bed) (e.g. location and size of objects in the identified room).

Figure 2B:
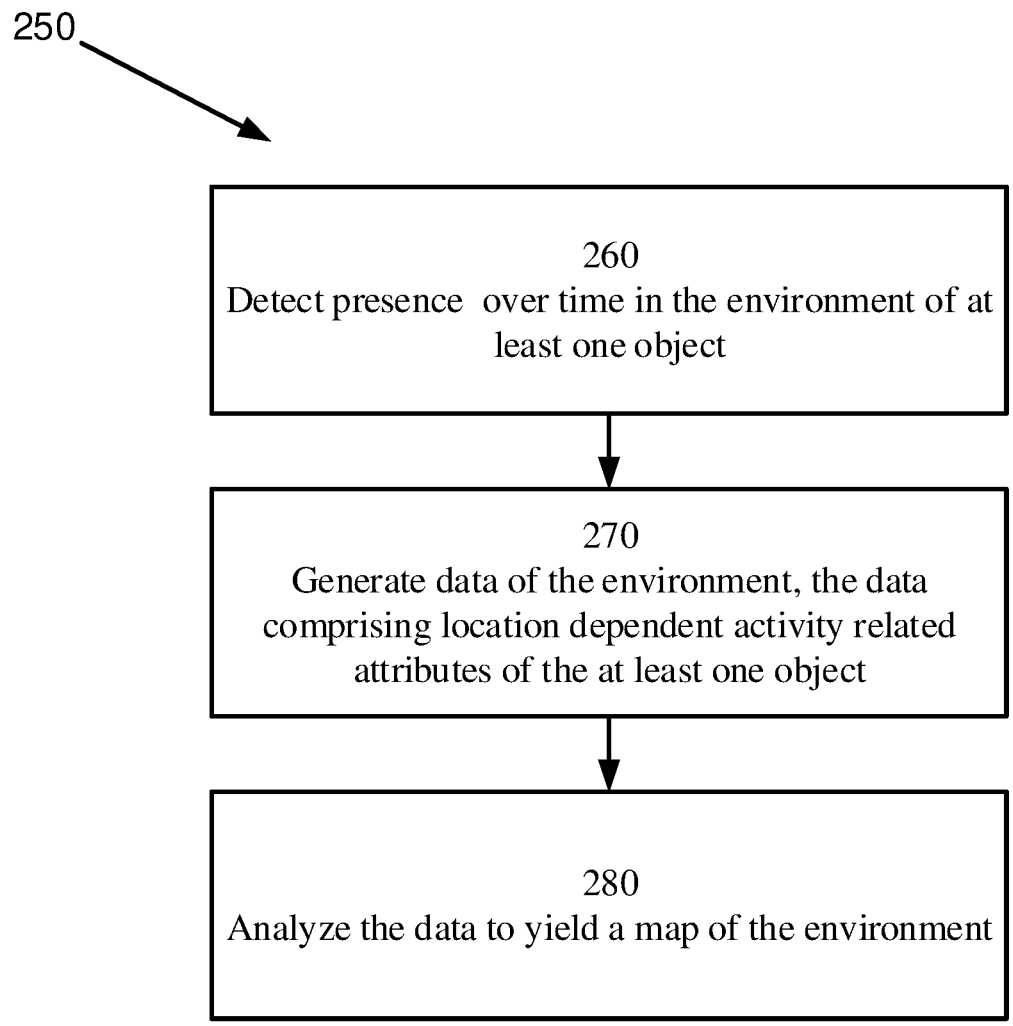

FIG. 2B is a flowchart illustrating a method 250 for mapping an environment or updating an environment map such as indoor environment map, in accordance with some embodiments. At step 260 a plurality of sensors can detect over time the presence of one or more objects in the environment. At step 270 data including for example location dependent activity related attributes of the detected one or more objects is generated. At step 280 the data can be analyzed by one or more processors to yield a map of the environment.

Figure 3:
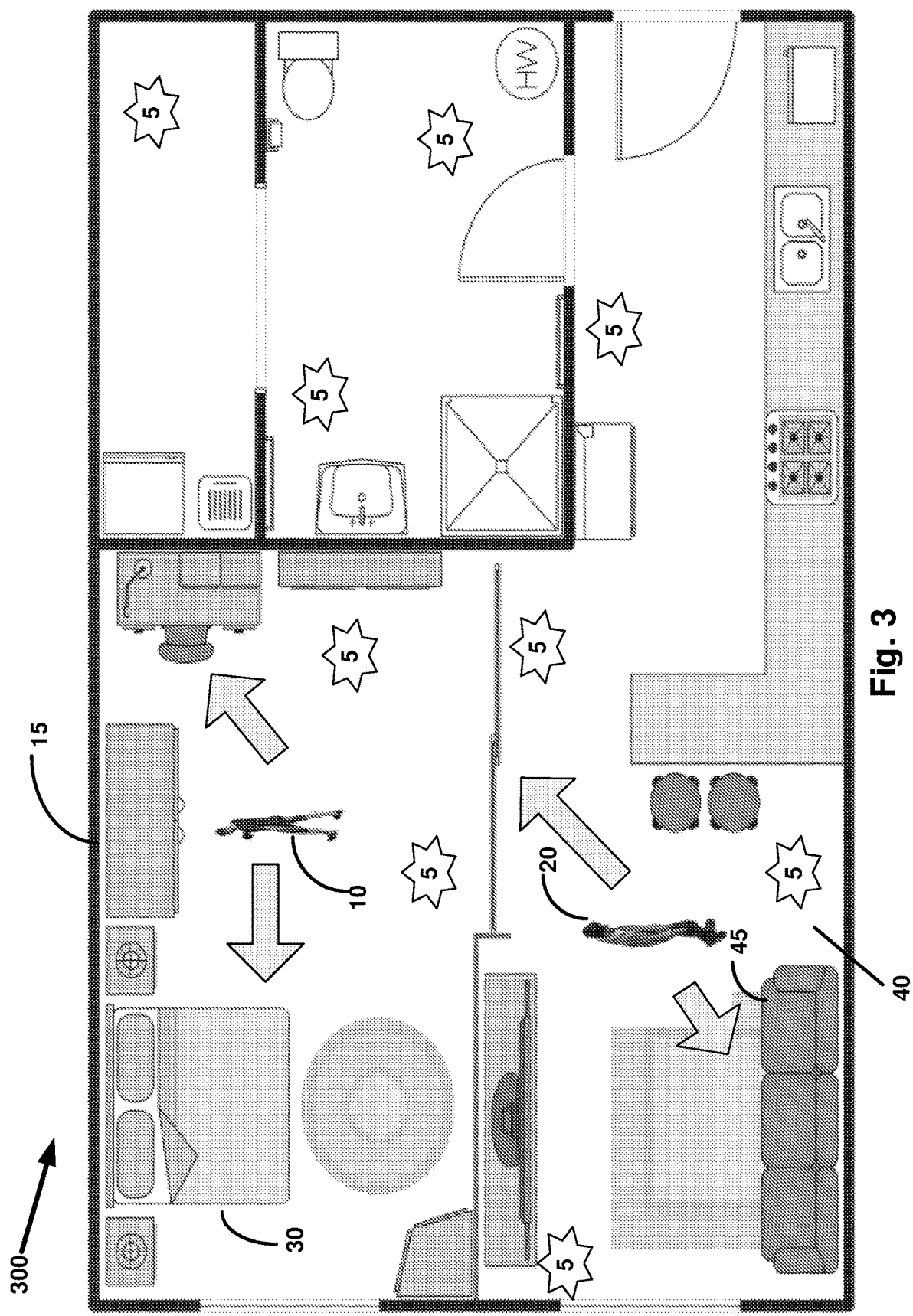
FIG. 3 schematically demonstrates an indoor map of an apartment, provided in accordance with some embodiments.

FIG. 3 illustrates an indoor map of an apartment 300, as provided in accordance with some embodiments. The apartment 300 can be equipped with a number of sensors 5 located in predefined places at each room. For example, two sensors 5 may be placed in each room for monitoring the movements of one or more objects 10 and 20 in the apartment 300. The captured data can be transmitted to a processor located, for example, at one of the object's mobile device or at a server, which is in communication with a device having a display. According to some embodiments, the processor is configured to analyze the received data and based on the location dependent activity related attributes of the user's or movements of other elements in the apartment construct a detailed mapping of the apartment 300. For example, the sensor can identify movement of object 10 in room 15 to object 30 between 9-11 pm and from object 30 between 6-8 am. Based on these identifications, the object 30 can be identified as a bed and the room 15 as the bedroom. In addition, according to some embodiments, the processor can identify movements in room 40 to object 45 during specific time each day and identify object 45 as a sofa and room 40 as the living room.

Figure 4A:
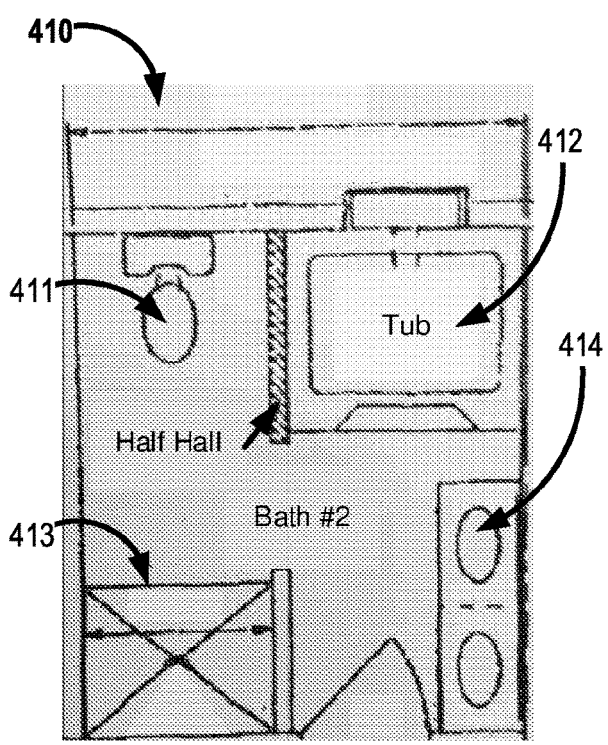
FIGS. 4A, 4B, 4C and 4D schematically demonstrate an activity map generated by an exemplary system for monitoring an activity in a bathroom.
Figure 4B:
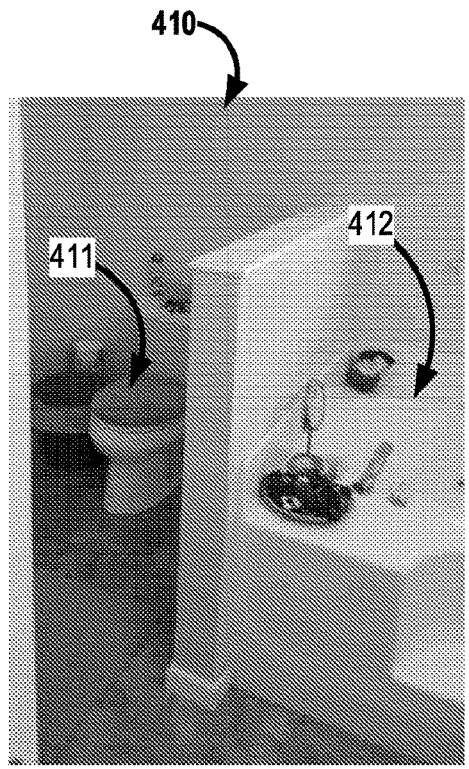
Figure 4C:
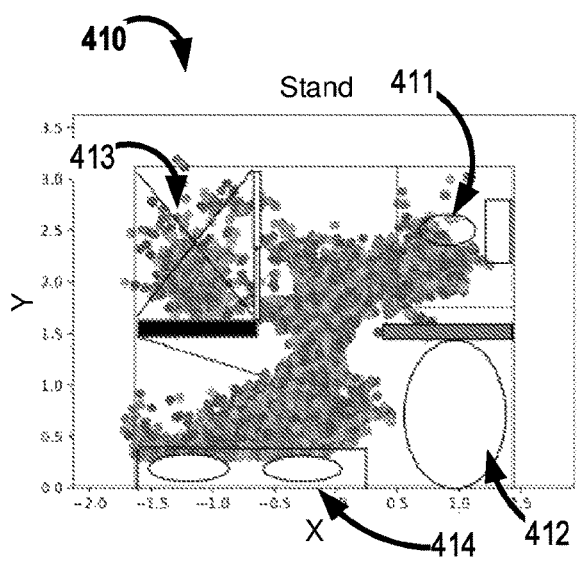
Figure 4D:
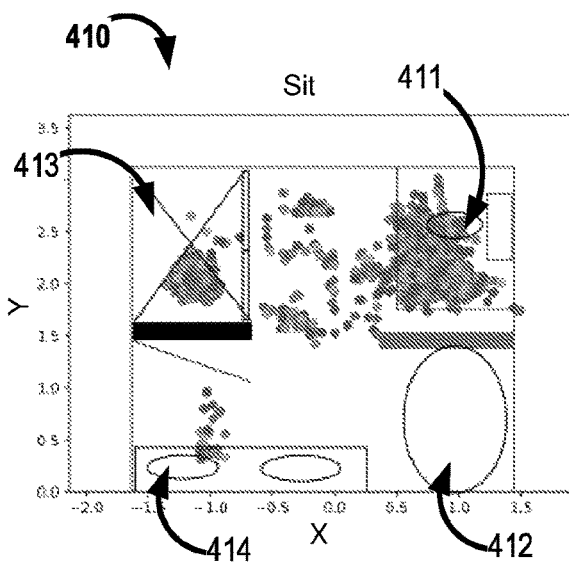

FIGS. 4A-4D illustrate an activity map gathered by a non-limiting exemplary system for monitoring an activity in a bathroom, with the specific aim of warning in the case of a person slipping and falling to the floor, according to some of the above-mentioned embodiments. According to some embodiments, the an important step in the operation of such a system is the mapping of the interior of the bathroom 410 (FIG. 4A demonstrates a 2D map of the bathroom; FIG. 4B demonstrates a 3D image of the bathroom), and identifying the locations of elements such as a toilet 411, a bath 412, a shower 413, a faucet 414. According to some embodiments, the information on typical trajectories and postures of a person in this space are important for detecting abnormal situations. For example, a person sitting on a toilet or on a stool is normal, while at some other location it may be abnormal. Another example of using spatial information is for setting location-dependent detection threshold—e.g. the ripple on the water in a toilet may generate false alarms. FIG. 4A shows an architectural plan of a bathroom; FIG. 4B shows a representative photo of the interior; FIG. 4C shows a map illustrating the location-dependent activity of a person while being classified as standing; FIG. 4D shows a map illustrating the location-dependent activity of a person while being classified as sitting.

According to some embodiments, the information illustrated in FIGS. 4C and 4D can be gathered over a period of a day during normal operation of the system. It is noted that the mapping of an environment can be augmented by a preliminary stage in which a person intentionally traverses the space and visits locations of interest. For example, the person can traverse the periphery of the rooms, sit on chairs, on a toilet, stand in the shower, lie in bed, assisting thus in faster and more reliable acquisition of an initial map, which can then be further augmented by tracking the ongoing activity in the environment of interest. The activity information can be further overlaid with reflections from static objects and surfaces, such as walls, floor and ceiling, of from room corners, serving as corner reflectors. Additional information is gathered by observing "shadows", the variations in reflections form the walls as person moves in the environment of interest, and occasionally obstructs the propagating path towards the static object. The three-dimensional information is of further value in validating proper installation of the system, in terms of location in the room and height above the floor.

Figure 5:
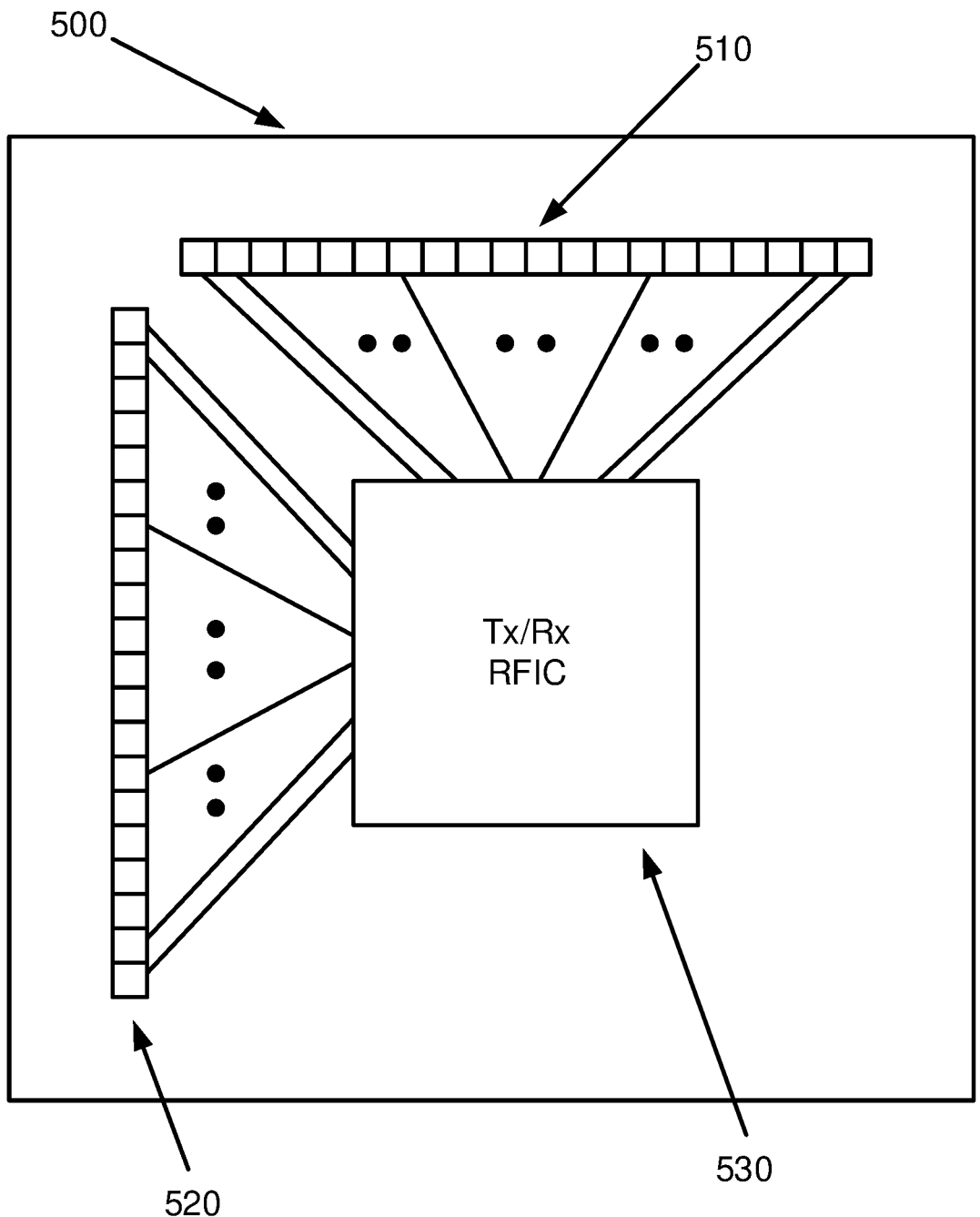
FIG. 5 schematically demonstrate an optional embodiment of a 3D sensor that uses MIMO radar technology.

FIG. 5 illustrates schematically an optional embodiment of a 3D sensor that uses MIMO radar technology in the 60 GHz band. The radar comprises a 20-antenna transmit array, responsible for the elevation resolution; a 20-antenna receive array responsible for the azimuth resolution, and Vayyar's VYYR7202 RFIC responsible for the broadband signal generation and recording, interfacing to the 40 antennas. The broadband operation of the radar account for the distance resolution, which complements the 3D detection and measurement capability. The RFIC is capable of measuring phase variations, providing thus capability to detect Doppler and micro-Doppler motion-induced shifts. Obviously, other frequency bands (such as UWB) and antenna array combinations are possible, without detracting from the generality of the proposed methods.

According to some embodiments, the processing unit can be a digital processing device including one or more hardware central processing units (CPU) that carry out the device's functions. In still further optional embodiments, the digital processing device further comprises an operating system configured to perform executable instructions. In some embodiments, the digital processing device is optionally connected a computer network. In further optional embodiments, the digital processing device is optionally connected to the Internet such that it accesses the World Wide Web. In still further optional embodiments, the digital processing device is optionally connected to a cloud computing infrastructure. In other embodiments, the digital processing device is optionally connected to an intranet. In other embodiments, the digital processing device is optionally connected to a data storage device.

According to some embodiments, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicle's computers. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications.

In some embodiments, the device includes a storage and/or memory device. The storage and/or memory device is one or more physical apparatuses used to store data or programs on a temporary or permanent basis. In some embodiments, the device is volatile memory (such as SRAM or DRAM) and requires power to maintain stored information. In some embodiments, the device is non-volatile memory (such as EPROM, EEPROM, Flash EPROM, FRAM) and retains stored information when the digital processing device is not powered. In other embodiments, the device is a storage device including, by way of non-limiting examples, CD-ROMs, DVDs, flash memory devices, magnetic disk drives, magnetic tapes drives, optical disk drives, and cloud computing based storage. In further optional embodiments, the storage and/or memory device is a combination of devices such as those disclosed herein.

In some embodiments, the device includes a display to send visual information to a user. The display may be a cathode ray tube (CRT), a liquid crystal display (LCD), a thin film transistor liquid crystal display (TFT-LCD), a light emitting diode (LED) display and so on. In still further optional embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further optional embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further optional embodiments, a computer readable storage medium is a tangible component of a digital processing device. In still further optional embodiments, a computer readable storage medium is optionally removable from a digital processing device.

In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. According to some embodiments, a computer program includes a sequence of instructions, executable in the digital processing device's CPU, written to perform a specified task. According to some embodiments, computer readable instructions can be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

According to some embodiments, the functionality of the computer readable instructions can be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof. In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further optional embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further optional embodiments, a database is web-based. In still further optional embodiments, a database is cloud computing-based. In other embodiments, a database is based on one or more local computer storage devices.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computer implemented method for mapping an environment, the method comprising:
   continuously scanning, via at least one transmit/receive module, the environment's volume for detecting objects, the transmit/receive module is configured to transmit signals and receive their reflection; wherein the step of scanning further comprises:
   transmitting a plurality of radar signals towards at least a set of the objects, each signal of the plurality of signals emanating from a separate radar antenna, and receiving reflected radar signals, each of the reflected radar signals having an amplitude attenuation and a phase shift relative to the transmitted radar signal;
   measuring the location of the objects' reflected signals and optionally their strength, via at least one acquisition module and at least one processor; and
   constructing a real-time updated three-dimensional (3D) voxels' map of the environment; and associating for each voxel a time record of events and optionally their respective event features; wherein each event comprises at least the voxel's detected presence of signal/s; and wherein at least one of the following (i,ii) holds true:
   i. the step of measuring further comprises:
      decomposing the reflected radar signals into signal elements, each of the signal elements having a spatial component and a temporal component, and computing a periodicity of each of the signal elements from the temporal component associated with each of the signal elements;
   ii. the step of constructing further comprises:
      assigning a voxel value to each voxel in accordance with a collective amplitude attenuation and a collective phase shift of the reflected radar signals,
      decomposing the voxel values into voxel elements, each of the voxel elements having a spatial component and a temporal component, and
      computing a periodicity of each of the voxel elements from the temporal component associated with each of the voxel elements.

2. The method of claim 1, further comprising:
   continuously analyzing the record of each voxel in the map, with respect to the record of its neighbor voxels, to determine if objects are detected and their associated features;
   the features of each detected object comprise one or more of: signals strength, dimensions, shape, motion spatial patterns and motion schedule patterns; and
   continuously updating the event records of the respective voxels with the detected objects and their associated features.

3. The method of claim 2, further comprising:
   continuously classifying the detected objects, based on their detected features; and
   continuously updating the event records of the respective voxels with the classification of the detected objects.

4. The method of claim 3, wherein the classification comprises determining at least one of:
   whether each of the detected objects is static or dynamic;
   whether each of the detected objects is a living object or an inanimate object;
   material of each of the detected objects;
   a purpose and/or use of at least one of the detected objects and/or a collection of the detected objects;
   a purpose and/or use of the motion pattern and/or the motion schedule of at least one of the detected objects;
   wellbeing and/or status of at least one of the detected objects; and
   any combination thereof.

5. The method of claim 3, wherein the step of classifying further comprises comparing the features of each detected object to a database of known objects and their corresponding features and/or classifications.

6. The method of claim 5, wherein the step of classifying further comprises updating the database with the features of the newly classified objects.

7. The method of claim 5, wherein classifying comprises instructing the detected and/or classified object to perform at least one known motion pattern and updating the database based on the scanned motion features.

8. The method of claim 3, further comprising associating each voxel with its events' statistics; wherein the statistics are evaluated per at least one of: the signals' strength, the detected objects, the features of the detected objects, the determined classifications of the detected objects and any combination thereof.

9. The method of claim 8, further comprising alerting of an unusual motion pattern of at least one of the detected objects, based on the voxels' associated statistics.

10. The method of claim 1, wherein the step of scanning further comprises transmitting radar signals and receiving reflected radar signals, via the at least one transmit/receive module; wherein the radar signals are selected from a group comprising: pulse signals; stepped frequency signals; frequency-modulated continuous-wave (FMCW) signals; and chirp signals.

11. The method of claim 1, wherein the environment comprises at least one of: an indoor space, an outdoor predefined space, a vehicle interior, an aircraft interior, a spacecraft interior.

12. The method of claim 2, wherein the motion spatial pattern comprises at least one of: direction, gesture, attribute, trait, habit, and characteristic feature.

13. The method of claim 1, further comprising displaying the reconstructed map, and optional alerts.

14. The method of claim 1, further comprising constructing a two-dimensional (2D) pixels' map by reducing a dimension from the 3D voxels' map; for each pixel associating the time record of events of its corresponding voxels and their reduced measure.

15. A system configured for mapping an environment, the system comprising:
at least one transmit/receive module configured to transmit radar signals and receive reflected radar signals through an antenna array, and thereby configured detect location over time of at least one object in the environment; wherein the at least one transmit/receive module is further configured to:
transmit a plurality of radar signals towards at least a set of the objects, each signal of the plurality of signals emanating from a separate radar antenna, and receive reflected radar signals, each of the reflected radar signals having an amplitude attenuation and a phase shift relative to the transmitted radar signal;
at least one acquisition module configured to collect and digitize the signals from the transmit/receive module;
at least one processor coupled to the at least one acquisition module, the processor configured to control the at least one transmit/receive module, and to process real-time radar signals received therefrom, wherein the processor contains memory storage for data and is arranged to perform:
continuously scan, via the at least one transmit/receive module, the environment's volume to detect objects;
measure the location of the objects' reflected signals and optionally their strength, via the at least one acquisition module and the at least one processor;
construct, via the at least one processor, a real-time updated three-dimensional (3D) voxels' map of the environment, wherein and for each voxel, the map associates a time record of events and optionally their respective event features; wherein each event comprises at least the voxel's detected presence of signal/s;
and wherein at least one of the following (i,ii) holds true:
i. the processor is further configured to:
decompose the reflected radar signals into signal elements, each of the signal elements having a spatial component and a temporal component, and
compute a periodicity of each of the signal elements from the temporal component associated with each of the signal elements;
ii. the processor is further configured to:
assign a voxel value to each voxel in accordance with a collective amplitude attenuation and a collective phase shift of the reflected radar signals,
decompose the voxel values into voxel elements, each of the voxel elements having a spatial component and a temporal component, and
compute a periodicity of each of the voxel elements from the temporal component associated with each of the voxel elements.

16. The system of claim 15, further comprising a display and sound device configured to present the constructed map and optional alerts.

17. The system of claim 15, wherein the at least one transmit/receive module comprises:
a wideband electromagnetic transducer array, the array comprising a plurality of electromagnetic transducers;
a transmitter unit configured to apply radio-frequency (RF) signals to the electromagnetic transducer array; and
a receiver unit configured to receive coupled RF signals from the electromagnetic transducers array;
and wherein the RF signals are selected from a group comprising: pulse signals; stepped frequency signals; frequency-modulated continuous-wave (FMCW) signals; chirp signals.

18. The system of claim 15, wherein the environment comprises at least one of: an indoor space, an outdoor predefined space, a vehicle interior, an aircraft interior, a spacecraft interior.

19. The system of claim 15, wherein at least one of the processors includes the data acquisition module, which is configured to collect and to digitize the signals from the transmit/receive module.

* * * * *